Figure 2:
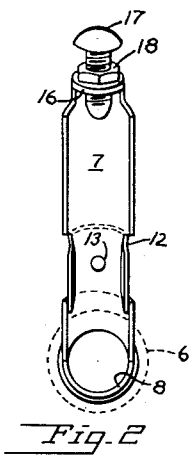

Sept. 4, 1951  R. W. MURDOCK  2,567,024
BENT STUD CHUCK
Filed April 16, 1948

INVENTOR.
ROBERT W. MURDOCK
BY *Charles S. Evans*
his ATTORNEY

Patented Sept. 4, 1951

2,567,024

UNITED STATES PATENT OFFICE 2,567,024

BENT STUD CHUCK

Robert W. Murdock, Orinda, Calif., assignor, by mesne assignments, to Morton Gregory Corporation, a corporation of Michigan Application April 16, 1948, Serial No. 21,344

4 Claims. (Cl. 279—66)

My invention relates to welding gun chucks for holding studs to be welded to a base plate; and the main object of the invention is to provide a chuck into which a bent stud may be readily inserted before welding and from which the chuck may be readily disengaged after the stud has been welded in place. Another object is the provision of a chuck which can be made at relatively low cost.

My invention has other objects which will be explained in the following description of that form of the invention which is illustrated in the drawings. It is to be understood that the invention is not limited to this single embodiment, but may be included in a plurality of forms as set forth in the claims.

Figure 1:
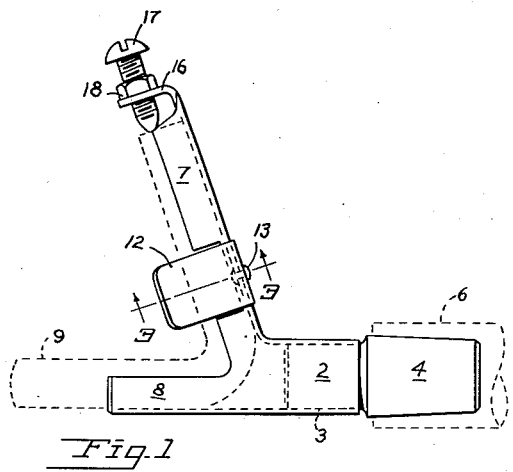
Figure 3:
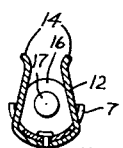

Referring to the drawings:

Figure 1 is a side elevation of my bent stud chuck. The socket end of the welding gun in which the chuck seats, and also a bent stud are shown in dotted lines. Figure 2 is an end view of the chuck; and Figure 3 is a sectional view taken in a plane indicated by the line 3—3 of Figure 1.

The invention and development of the stud welding gun and welding studs which makes it possible to weld a stud to a surface quickly and cheaply has caused revolutionary changes in manufacturing methods and structural steel fabrication. At first only straight studs were welded, but the entire practicability of welding studs, preformed to adapt them for special uses, quickly became apparent. Among many shapes are studs the free ends of which are turned at an angle to the main body. The present invention is concerned with a chuck for holding such bent studs in the welding gun.

Because the chuck is made to conform to the angle in the stud, and because there are studs with many different angles, a number of chucks are necessary. Hence the cost of making them becomes a matter of more than the usual importance.

A piece of tubing is split axially for part of its length. One of the split portions is left in its original alignment with the unsplit portion or main body, and the other portion or arm is bent back at the same angle as the stud it is to hold, thus providing a V-shaped grooved socket in which the bent stud may be placed and in which it lies without turning. Spring means are provided for resiliently holding the stud in the socket, and a plug having a standard taper shank is arranged in the unsplit end of the tube so that it may be readily mounted in and demounted from the welding gun. A stop bearing on the free end of the stud may be disposed at the end of the bent arm if found desirable.

More in detail and referring specifically to the drawings, my chuck comprises a tubular body 2 in the end of which a plug 3 is fixed by brazing, shrinking the tube over the plug, force fit, or other practicable method. The end 4 of the plug is shaped to fit the socket end 6 of a welding gun. A No. 2 Morse taper is conveniently used; and it will be understood of course that all the chucks intended for use in the same welding gun are made with a shank of the same taper.

In the course of manufacture, an arm 7, amounting to one-half of the tube circumferentially, is split from the remaining half 8 in an axial plane, and then is bent back at an angle to the plane, which is equal to the angle at which the stud 9, shown in dotted lines in Figure 1, is bent. Thus the two separated arms 7 and 8 of the tube together form a V-shaped grooved socket, the groove having the cross section of one-half the tube. Preferably the inside diameter of the tube is the same as, or a trifle larger than, the diameter of the stud it is to be used with. The arm 8 of the tube remains unchanged in its position relative to the main body, when the arm 7 is bent back; and this insures that the axis of the welding end of the stud lies substantially in the axis of the chuck and gun; and is not materially offset therefrom.

Means are provided for retaining the bent stud in the socket provided in the angle between the two arms. A U-shaped spring 12 is fixed by rivet 13 through the back of one of the arms, as for example arm 7. The spring preferably encloses the arm, portions of which are cut away to give free play to the enclosing fingers, the ends 14 of which are spaced apart at a distance sufficient to permit forced seating of the stud as well as its removal.

The arm 8 is left of a length sufficient to securely hold the welding end of the stud, but not so long as to interfere with the welding operation; but the arm 7 is made longer than the bent end of the stud, and narrowed to a tab which is then bent forwardly to serve as a mounting flange 16 for the adjustable stop formed by the screw 17 and lock nut 18. When properly adjusted, the pointed end of the screw engages the end of the stud with a stiff resilience which holds it solidly in its seat in the straight arm.

I claim:

1. A chuck for a welding stud having two angularly disposed legs, comprising a grooved body having a shank for connection to a welding gun, an arm extending angularly from the body and having a groove therein, said grooves forming an angle therebetween equal to the angle between the legs of said stud, spring means in association with one of the grooves for resiliently retaining a bent stud in both grooves, and stop means on the end of the arm lying in the path of the groove in said arm, said stop means being adapted to engage the end of one leg of the stud for seating the other leg of the stud longitudinally in the groove in said body.

2. A chuck for a welding stud having two angularly disposed legs, comprising a tubular body, a plug filling one end of the tube and having thereon a shank for connection to a welding gun, the other end of said tube being split longitudinally and one of the split portions being bent out at an angle to the other split portion, said split portions providing grooves for receiving the legs of said stud, spring means in association with one of the split portions for resiliently retaining the bent stud in both portions, and a stop member at the end of said outwardly bent split portion lying in the path of said groove, said stop member being adapted to abut against the end of one leg of said stud for seating the other leg of the stud longitudinally in the groove of the other split portion.

3. A chuck for a welding stud having two angularly related legs comprising a short length of tubing, a plug at one end of said tubing fashioned into a shank for connecting the stud to a welding gun, the other end of said tubing being split longitudinally and one of the split portions being bent out at an angle to the other split portion corresponding to the angle between the legs of said stud, said split portions providing a V-shaped grooved socket into which said stud is adapted to be inserted with the legs of said stud disposed one within each of said split portions, spring means associated with one of said split portions for retaining said stud within said V-shaped socket, the outer end portion of said outwardly bent split portion being bent so as to lie in the path of the groove of said split portion, and means secured to said last mentioned bent portion providing a stop against which the end of one leg of said stud is adapted to abut when the stud is inserted within said V-shaped socket.

4. A chuck for a welding stud having two angularly related legs comprising a short length of tubing, a plug at one end of said tubing fashioned into a shank for connecting the stud to a welding gun, the other end of said tubing being split longitudinally and one of the split portions being bent out at an angle to the other split portion corresponding to the angle between the legs of said stud, said split portions providing a V-shaped grooved socket into which said stud is adapted to be inserted with the legs of said stud disposed one within each of said split portions, spring means associated with one of said split portions for retaining said stud within said V-shaped socket.

ROBERT W. MURDOCK.

REFERENCES CITED

The following references are of record in the file of this patent:

UNITED STATES PATENTS

| Number | Name | Date |
| --- | --- | --- |
| 2,402,256 | Nelson | June 18, 1946 |
| 2,431,594 | Wernig | Nov. 25, 1947 |